US008149793B2

(12) United States Patent
Baker et al.

(10) Patent No.: US 8,149,793 B2
(45) Date of Patent: Apr. 3, 2012

(54) ALLOCATION OF ACCESS SLOTS TO MOBILE STATIONS IN ORDER TO COUNT THE NUMBER OF STATIONS INTERESTED IN A MBMS (MULTIMEDIA BROADCAST/MULTICAST SERVICE)

(75) Inventors: Matthew P. J. Baker, Canterbury (GB); Olivier J. M. Hus, Redhill (GB); Timothy J. Moulsley, Caterham (GB)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 815 days.

(21) Appl. No.: 10/599,858

(22) PCT Filed: Apr. 13, 2005

(86) PCT No.: PCT/IB2005/051218
§ 371 (c)(1),
(2), (4) Date: Oct. 12, 2006

(87) PCT Pub. No.: WO2005/101738
PCT Pub. Date: Oct. 27, 2005

(65) Prior Publication Data
US 2008/0267136 A1 Oct. 30, 2008

(30) Foreign Application Priority Data
Apr. 15, 2004 (GB) .................................. 0408383.8

(51) Int. Cl.
H04W 4/00 (2009.01)
H04B 7/00 (2006.01)
(52) U.S. Cl. .......................... 370/336; 370/328; 455/522
(58) Field of Classification Search .................. 370/336, 370/329, 348, 318, 342; 725/149, 46; 702/191; 455/522
See application file for complete search history.

(56) References Cited

U.S. PATENT DOCUMENTS
4,440,839 A 4/1984 Mottier
(Continued)

FOREIGN PATENT DOCUMENTS
CN 1301436 A 6/2001
(Continued)

OTHER PUBLICATIONS
Document: "Mechanisms for Counting and Re-Counting MBMS Users in IDLE/URA PCH-Like States"; Source: Vodafone Group; 3GPP TSG-RAN/23 Joint MBMS Meeting #1, Wokingham, Berks, UK, Jan. 15-16, 2003; Tdoc R2-030063; pp. 1-2; XP-2259501A.
(Continued)

Primary Examiner — George Eng
Assistant Examiner — Nizar Sivji

(57) ABSTRACT

A method of operating a radio network, such as UMTS or cdma2000, which comprises at least one primary station (PS), i.e. and access point or bare station, and a plurality of secondary stations (SSI, SS2, SS3), i.e. mobile stations. The primary station determines the level of interest of the users of the secondary stations in a particular service, such as Multimedia Broadcasting and Multicast Services (MBMS), by allocating a respective plurality of access slots in which the secondary stations can transmit an indication of its interest. The primary station receives the indications of interest to and estimates the level of interest from the number of transmitted indications, for example whether or not they exceed a threshold value. Depending on the result of the estimation process the primary station selects a particular one of at least two transmission modes for transmitting the service. According to said "approximation counting" of users interested in an MBMS service, the primary station selects a certain transmission mode for the implementation of the service (i.e. a point-to-point or a point-to-multipoint basis).

20 Claims, 2 Drawing Sheets

U.S. PATENT DOCUMENTS

| | | | |
|---|---|---|---|
| 4,458,980 | A | 7/1984 | Ohki et al. |
| 4,595,810 | A | 6/1986 | Barnes |
| 4,907,847 | A | 3/1990 | Onayama et al. |
| 5,655,215 | A | 8/1997 | Diachina et al. |
| 6,611,514 | B1 * | 8/2003 | Moulsley ............... 370/348 |
| 6,700,878 | B2 * | 3/2004 | Salloum Salazar et al. .. 370/329 |
| 6,765,883 | B1 * | 7/2004 | van Heeswyk ............... 370/318 |
| 2002/0069038 | A1 * | 6/2002 | Cooper ............... 702/191 |
| 2002/0083465 | A1 * | 6/2002 | Van Beek ............... 725/119 |
| 2003/0072321 | A1 * | 4/2003 | Salloum Salazar et al. .. 370/442 |
| 2003/0120817 | A1 | 6/2003 | Ott et al. |
| 2004/0008679 | A1 * | 1/2004 | Sinnarajah et al. ........... 370/390 |
| 2005/0053068 | A1 * | 3/2005 | Toth et al. ............... 370/390 |

FOREIGN PATENT DOCUMENTS

| | | | |
|---|---|---|---|
| DE | 3404673 | A1 | 8/1985 |
| GB | 2109583 | A | 6/1983 |
| WO | 0074416 | A1 | 12/2000 |
| WO | 0160104 | A1 | 8/2001 |
| WO | 0173970 | A2 | 10/2001 |
| WO | WO03036872 | A1 | 5/2003 |
| WO | WO2004006615 | A1 | 1/2004 |
| WO | 2004017580 | A1 | 2/2004 |
| WO | WO2004089030 | A1 | 10/2004 |

OTHER PUBLICATIONS

Technical Document: 3GPP TS 25.346 V6.0.0, Mar. 2004; 3RD Generation Partnership Project; Technical Specification Group Radio Access Network; Introduction of Tthe Multimedia Broadcast Multicast Service; (MBMS) in the Radio Access Network (RAN); Stage 2 (Release 6); pp. 1-50; XP-002307039.

Technical Document: 3GPP TS 23.846 2.0.0, Sep. 2002; 3RD Generation Partnership Project; Technical Specification Group Services and System Aspects; Multimedia Broadcast/Multicast Service; Architecture and Functional Description (Release 6); pp. 1-114; XP-2258084A.

Document: "MBMS Scenarios—UE Link Handling"; Source: Nortel Networks/Samsung; 3GPP TSG-RAN2/RAN3 #35 Meeting, Seoul, Korea, Apr. 7-11, 2003; pp. 1-7; XP-2292826A.

Written Opinion of the International Search Report PCT-IB2005/051218.

\* cited by examiner

ALLOCATION OF ACCESS SLOTS TO MOBILE STATIONS IN ORDER TO COUNT THE NUMBER OF STATIONS INTERESTED IN A MBMS (MULTIMEDIA BROADCAST/MULTICAST SERVICE)

The present invention relates to a radio network, to a method of operating the radio network, and to radio stations for use in a radio network. The present invention has particular, but not exclusive application to the provision of multimedia broadcast and multicast services in mobile radio networks such as third generation mobile radio systems of which UMTS (Universal Mobile Telephone System) and cdma2000 (code division multiple access 2000) are two examples.

There is a current interest in specifying Multimedia Broadcast and Multicast Services (MBMS) for third generation mobile telephone systems in order to enable efficient delivery of multimedia services to multiple mobile terminals simultaneously.

There are situations in which a mobile radio network operator would be interested in ascertaining the number of users who are, or are likely to be, interested in receiving a particular service. Such information may be used to determine the best mechanism for service delivery across the air interface between the base or primary station(s) and the subscriber or secondary stations. For example, if only a few users are interested in a given service, it may be more efficient to set-up separate dedicated channels to deliver the service to each user, where the dedicated channels, that is point-to-point channels, can then be individually power controlled according to the prevailing radio channel conditions for those users. Conversely, a common channel, that is a point-to-multipoint channel, would usually be more efficient if the service is to be delivered to a large number of users. A high transmit power would usually be used such that users situated anywhere in the cell could satisfactorily receive the service.

In UMTS the currently proposed methods for counting interested secondary stations are based on requesting interested secondary stations to transit to the PMM-Connected State (PMM=Packet Mobility Mode). The number of secondary stations performing this state transition is then counted by the primary station or network controller. The request to transit to the PMM-Connected State may be explicit, or alternatively the secondary stations may autonomously enter this state periodically.

However, this method requires a significant amount of signalling to be transmitted between the secondary stations and the network controller as well as significant signalling traffic within the network itself, for example transmission of subscriber profiles from the HLR (Home Location Register).

When large numbers of users are interested in receiving a service, individual information about each user is generally not required, so most of the signalling information is redundant. Further, such a high signalling load over the air interface is wasteful of radio resources and generates unnecessary interference to other users.

An object of the present invention is to be able to estimate efficiently the number of users who are interested in receiving a service.

According to a first aspect of the present invention there is provided a method of operating a radio network comprising a primary station and a plurality of secondary stations, wherein the primary station determines the level of interest by users of secondary stations in a service by allocating a plurality of access time slots in which a secondary station can transmit an indication of its interest.

According to a second aspect of the present invention there is provided a radio network comprising a primary station and a plurality of secondary stations, wherein the primary station includes means for determining the level of interest by users of secondary stations in a service, said means adapted to allocate a plurality of access slots in which a secondary station can transmit an indication of its interest.

According to a third aspect of the present invention there is provided a primary station for use in a radio network comprising at least one primary station and a plurality of secondary stations, wherein the primary station includes means for determining the level of interest by users of secondary stations in a service, said means adapted to allocate a plurality of access slots in which a secondary station can transmit an indication of its interest.

According to a fourth aspect of the present invention there is provided a secondary station for use in a radio network comprising a primary station and a plurality of the secondary stations, wherein the primary station includes means for determining the level of interest by users of secondary stations in a service, said means adapted to allocate a plurality of access slots in which a secondary station can transmit an indication of its interest, wherein the secondary station has means for indicating its interest in the service by transmitting a predetermined signal in selected one of the plurality of access slots.

In the present specification the term "access slot" means a specific combination of a signature and a time slot.

The present invention is based on the recognition that when the number of secondary stations being counted is large, it will often not be necessary to obtain an accurate count of the number of secondary stations, but rather to ascertain that the number of terminals is significantly greater than an arbitrary threshold, for example the threshold for using point-to-multipoint service delivery.

The present invention will now be described, by way of example, with reference to the accompanying drawings, wherein.

In the drawings the same reference numerals have been used to indicate corresponding features.

Figure 1:
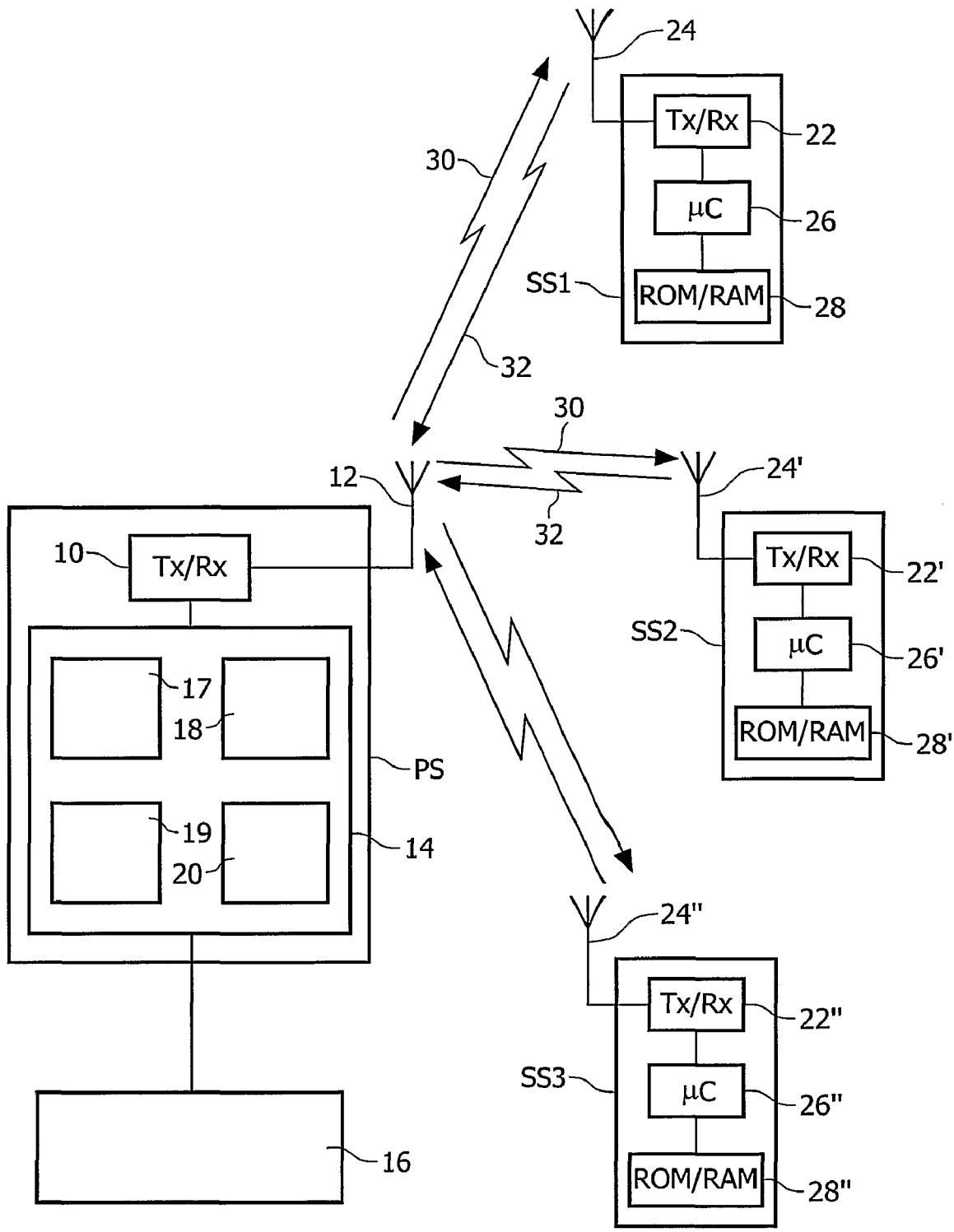
FIG. 1 is a diagrammatic view of a radio network.

The radio network shown in FIG. 1 comprises at least one primary station PS which includes a spread spectrum transceiver 10 having a radio frequency inlet/outlet coupled to signal propagation means 12. A controller 14 is coupled to the transceiver 10 for controlling the primary station to operate as described below. The controller is a suitably programmed digital computer but for the convenience of understanding the present invention the controller 14 is shown to include an estimating means 17, a selection means 18, an access slot store 19 and a signature store 20. A service supplier of multimedia and multicast services 16 is coupled by say a landline to the controller 14.

The network further comprises a plurality of secondary stations of which three stations SS1, SS2 and SS3 are shown. The secondary stations are able to roam in the radio coverage area of the primary station's transceiver 10. The secondary stations SS1, SS2 and SS3 have substantially the same architecture and for convenience of description the secondary station SS1 will be described and the corresponding features in the secondary terminals SS2 and SS3 will be identified by primed and double primed reference numerals, respectively.

The secondary station SS1 comprises a spread spectrum transceiver 22 having a RF input/output coupled to an antenna 24. A programmed microprocessor 26 is coupled to the transceiver 22. A store 28 is coupled to the microprocessor 26. Communication between the primary station PS and the secondary stations SS1, SS2 and SS3 is by duplex downlinks 30/uplinks 32. The microprocessor 26 controls the secondary station SS1 to operate as described below.

Initiation of communication in the network area is by spread spectrum using a TDMA protocol comprising access slots, one of which access slots is selected at random by a secondary station when initiating communication with the primary station. The primary station PS makes available a known number of signatures and a known number of time slots and a secondary station when initiating communication selects one of these signatures and one of the time slots. The combination of a randomly selected time slot and a selected one of several signatures reduces the risk of collisions between secondary stations when communicating with the primary station. If the network area is large then the infrastructure architecture comprises a network controller coupled to geographically distributed primary stations each having its own service area contiguous with or partially overlapping adjacent areas. The primary station of each area has its own set of signatures which are different from those allotted to adjacent service areas.

In order to be able to estimate the number of secondary stations interested in receiving a service the primary station PS transmits periodically a programme guide which includes a list of services and maps a respective plurality of access slots to different services. To avoid confusion each combination of one time slot and one signature is contained in not more than one of the pluralities of access slots. However it is possible for each access slot in a respective plurality to use the same signature and for each access slot in the plurality to use a different time slot. Conversely it is possible for each access slot in a respective plurality to use the same time slot and for each access slot in the plurality to use a different signature.

The secondary station(s) interested in receiving a particular service can transmit(s) indications, for example a signature or a signature and another indicator. However since the information is used to determine the most efficient mode of transmission between say point-to-point, when a small number of secondary stations are interested in receiving a service, and point-to-multipoint, when a large number of secondary stations are interested in receiving a service, then the need for accuracy is biased towards determining the small numbers rather than the large number.

In implementing an embodiment of the method in accordance with the present invention using UMTS, a number of uplink RACH (Random Access Channel) access slots are allocated specifically for transmissions relating to the purpose of counting users. The slots may be allocated permanently or temporarily, and may for example be selected in a time-division manner from a set of access slots allocated specifically for MBMS signalling in general.

The number of such access slots allocated for counting may be chosen as a function of the threshold used by the network to decide between dedicated and common channels for delivery. For example, if a threshold value N is set, then typically the number of such access slots would be between N and 2N.

Each secondary station which wishes to be counted then operates a random function to select one of the allocated access slots and transmits a predetermined signal in the selected slot. Thus when the number of terminals being counted is small, the probability of multiple secondary stations selecting the same access slot will be low, and the network will obtain a reasonably accurate count of the number of interested secondary stations. The network could then for example send an additional request for the necessary signalling information to enable point-to-point links to be set up to those secondary stations.

As the number of secondary stations increases, the probability of collisions will increase. If the network received a predetermined signal in more than a certain proportion of the allocated access slots, it could assume that a large number of secondary stations were interested and establish a point-to-multipoint link.

In general the primary station (or network controller) would not be able to count the number of terminals transmitting the predetermined signal in the same access slot. However, in some situations it would be possible for the network to estimate this number from the number of correlation peaks received in a given access slot, the arrival of the peaks being varied due to the different propagation times of the respective signal, or from the level of received energy in the access slot, assuming that a power versus distance from primary station algorithm is used to control the transmission power by a respective secondary station. This information may be used to refine the estimated count.

As with the conventional state-transition method, the initiation of the counting process could be requested explicitly by the primary station (or network controller) on each occasion, or could be periodic according to a period set by the primary station (or network controller), or could be autonomous on the part of each secondary station. Some combination of these initiation methods could also be used.

Typically the allocated access slots would be specific to a given MBMS service or group of services. Different sets of access slots (for example on different sub-channels or at different times) could be used for counting secondary stations interested in different MBMS services. A secondary station simply maps between the access slots made available and a particular service.

The method in accordance with the present invention provides an efficient method for counting interested secondary stations, as the predetermined signal could be just a single signature or other code word and a large number of secondary stations may transmit at the same time, thus completing the process quickly. Further, the method in accordance with the present invention reduces the probability that large numbers of RACH access attempts arising from the known state transition method of counting would cause collisions with other uplink traffic, thus disrupting other uplink services.

Figure 2:
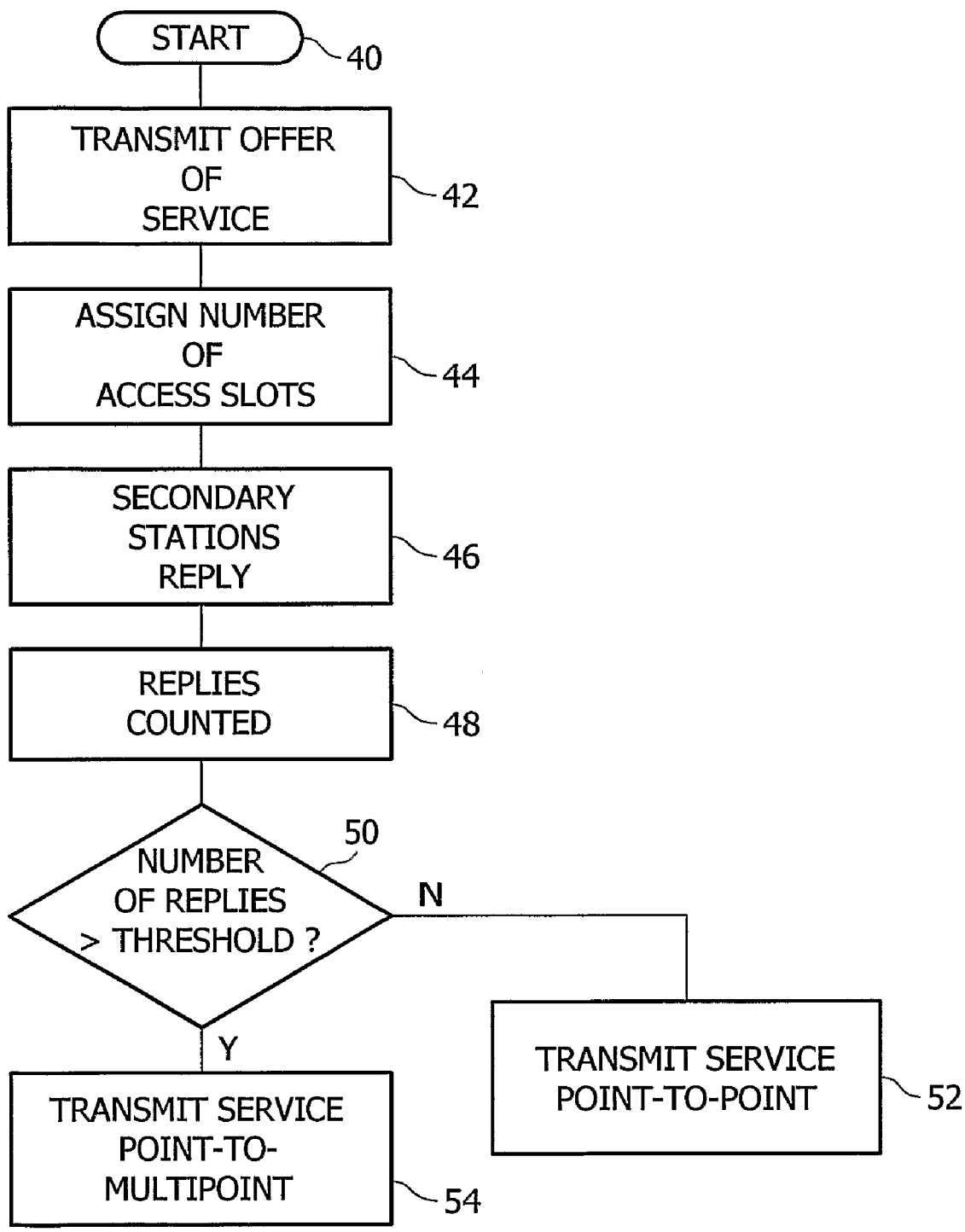
FIG. 2 is a flow chart relating to an embodiment of the method in accordance with the present invention.

FIG. 2 is a flow chart illustrating an implementation of the method in accordance with the present invention. The flow chart commences with a start block 40. The next block 42 represents the primary station PS transmitting an offer of service. Block 44 relates to the primary station (or network controller) assigning a plurality N of access slots, that is for example (a) a number of time slots and a number of signatures, (b) a single signature in a plurality of time slots or (c) a plurality of signatures in one time slot, for the purpose of estimating the numbers of secondary stations interested in receiving the service offered. The plurality N of access slots is related to the threshold value set for the type of service being offered.

Block 46 relates to secondary stations interested in receiving the service being offered transmitting replies in the access slots provided. A reply may comprise a predetermined signal transmitted in either a preselected one of, or a randomly selected one of, the plurality of access slots. Block 48 relates to the primary station (or network controller) estimating the number of replies, for example the number of occurrences of the same signature in different time slots of a given plurality, the number of randomly selected signatures in the same time slot or the number of randomly selected signatures in different randomly selected time slots of a given plurality, received. Block 50 relates to the primary station (or network controller) determining if the estimated number exceeds the threshold value set. If the answer is negative N, the service is transmitted on a point-to-point basis as indicated by block 52. If, however, the answer is positive Y, the service is transmitted on a point-to-multipoint basis as indicated by block 54.

Variations to the described method are possible. The efficiency of the counting method could be increased by dividing the population of the secondary stations into two or more sub-groups. In the first case, a first group of secondary stations could be allocated to a first set of access slots for transmission of the predetermined counting signal, while a second group of secondary stations could be allocated to a second, later, set of access slots. If the primary station (or network controller) received a signal in most or all of the first set of access slots thereby exceeding a threshold value, the primary station(s) could transmit a signal forbidding secondary stations in the second group from transmitting their counting signals in the later set of access slots. Thus the total uplink interference could be significantly reduced in cases where there were a large number of interested secondary stations exceeding the threshold value.

Another variation includes explicitly requested counting being performed using the conventional state-transition method and the method in accordance with the present invention being used for periodic autonomous updates or vice versa.

In a further variation additional information can be included in the counting signals. For example, by designating more than one signature or other code word to be used in the allocated access slots, or by allocating multiple sets of access slots, the secondary stations could signal some measure of their ability to receive a particular service, where the suitable measures could include (i) a SIR (Signal to Interference Ratio)-based metric, which could give the network an indication of the down link power level which would be required in order for the terminal to receive the service satisfactorily, and/or (ii) an indication of functional capability, for example whether the secondary station currently has the ability to receive the service in a point-to-point mode or point-to-multipoint mode or both.

Additionally or alternatively, by designating more than one signature or other code word to be used in the allocated access slots, or by allocating multiple sets of access slots, the secondary stations could signal a preference for certain parameters of the service in question. For example, some services may be provided with different degrees of quality, such as high- or low-resolution video. In some networks, separate data steams may be transmitted, with a basic data stream providing the low-quality data, and a supplementary stream (which can be decoded in conjunction with the basic stream) to provide a higher quality service for those users who wish to receive it.

Secondary stations could use a specific code word in the randomly selected time slot (or randomly select a time slot from a different allocated set of time slots) to indicate the quality level at which they wished to receive the service in question. This might enable the network to use, point-to-point channels for a supplementary data stream but point-to-multipoint channels for the basic data stream. Similarly, this quality information could be used by the network to decide not to transmit supplementary information if only a small number of secondary stations (or none) were interested in receiving the higher quality service.

Optionally, the transmission by a secondary station of its indication of interest may occur with a probability less than one. The value of the probability may be predetermined or signalled by the primary station. The primary station then divides the counted number of indications by the value of the probability in order to arrive at an estimate of the level of interest. This option can result in a lower level of interference and can result in a more accurate estimate of level of interest.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of spread spectrum radio networks and component parts therefor and which may be used instead of or in addition to features already described herein.

The invention claimed is:

1. A method of operating a radio network, the method comprising:
   providing a primary station (PS) and a plurality of secondary stations (SS1, SS2, SS3), determining, via the primary station, an estimated level of interest by users of secondary stations in a service by providing a plurality of random access slots that are selectively configured for permitting a temporary or permanent allocation of a portion of the plurality of random access slots based on the estimated level of interest of the users of the secondary stations, and
   indicating, via a secondary station of the plurality of secondary stations, the estimated level of interest by transmitting a predetermined signal in a preselected one of the plurality of random access slots, the estimated level of interest based on at least a threshold value;
   wherein each access slot of the plurality of random access slots includes a combination of one time slot and one signature, and wherein the primary station maps each of the plurality of random access slots to a different service such that all the secondary stations interested in one service transmit using one of the plurality of random access slots, and in that each combination of one time slot and one signature is contained in not more than one of the plurality of random access slots.

2. The method as claimed in claim 1, wherein the primary station computes the estimated level of interest from at least a number of transmitted indications and selects a transmission mode of the service in dependence on whether the estimated level of interest is relatively high or relatively low.

3. The method as claimed in claim 2, wherein the transmission mode for the relatively high level of interest is point-to-multipoint.

4. The method as claimed in claim 2, wherein the transmission mode for the relatively low level of interest is point-to-point.

5. The method as claimed in claim 2, wherein the primary station sets the threshold value for determining the transmission mode of the service and, when the number of transmitted indications exceeds the threshold value, the transmission mode for the relatively high level of interest is operated.

6. The method as claimed in claim 1, wherein each of the plurality of random access slots uses the same signature and in that each random access slot in the plurality of random access slots uses a different time slot.

7. The method as claimed in claim 1, wherein each of the plurality of random access slots uses the same time slot and in that each random access slot in the plurality of random access slots uses a different signature.

8. The method as claimed in claim 1, wherein the level of interest is transmitted as spread spectrum signals and a number of indications is estimated by estimating a number of correlation peaks in a given random access time slot.

9. The method as claimed in claim 1, wherein the level of interest is transmitted as spread spectrum signals and a number of indications is estimated by estimating a received energy in a given random access slot.

10. The method as claimed in claim 1, wherein the secondary stations are allocated to a respective one of two or more pluralities of access slots and in that a secondary station of the plurality of secondary stations desiring to transmit an indication of interest, transmits in its allocated plurality of random access slots.

11. The method as claimed in claim 10, wherein when an estimated level of interest exceeds a predetermined level of interest, the primary station instructs the plurality of secondary stations waiting to transmit in their allocated access slot not to transmit.

12. The method as claimed in claim 1, wherein a secondary station of the plurality of secondary stations indicating an interest in the service also indicates a quality level for receiving the service.

13. The method as claimed in claim 12, wherein the primary station transmits a higher quality level of service in a mode different from the transmission of a lower quality level of service.

14. The method as claimed in claim 1, the primary station transmits a basic data stream as a point-to-multipoint transmission and a supplementary data stream for enhancing a quality of the basic data stream as a point-to-point transmission.

15. A radio network comprising:
a primary station (PS) and a plurality of secondary stations (SS1, SS2, SS3), wherein the primary station (PS) includes means for determining an estimated level of interest by users of secondary stations in a service, the means providing a plurality of random access slots that are selectively configured for permitting a temporary or permanent allocation of a portion of the plurality of random access slots based on the estimated level of interest of the users of the secondary stations,
wherein a secondary station of the plurality of secondary stations indicates the estimated level of interest by transmitting a predetermined signal in a preselected one of the plurality of random access slots, the estimated level of interest based on at least a threshold value; and
wherein each access slot includes a combination of one time slot and one signature, wherein the primary station (PS) comprises means for mapping each of the plurality of random access slots to a different service such that all the secondary stations interested in one service transmit using one of the plurality of random access slots, and wherein each combination of one time slot and one signature is contained in not more than one of the plurality of random access slots.

16. The radio network as claimed in claim 15, further comprising estimating means for computing the estimated level of interest from at least a number of transmitted indications and mode selection means for selecting a transmission mode of the service in dependence on whether the estimated level of interest is relatively high or relatively low.

17. The radio network as claimed in claim 15, further comprising spread spectrum transceiving means and wherein an estimating means is adapted to estimate the level of interest by estimating a number of correlation peaks in a respective random access slot.

18. The radio network as claimed in claim 15, further comprising spread spectrum transceiving means and wherein an estimating means is adapted to estimate the level of interest by estimating a received energy in a respective random access slot.

19. A primary station for use in a radio network comprising:
at least one primary station (PS) and a plurality of secondary stations (SS1, SS2, SS3),
wherein the primary station (PS) includes means for determining an estimated level of interest by users of secondary stations in a service, the means providing a plurality of random access slots that are selectively configured for permitting a temporary or permanent allocation of a portion of the plurality of random access slots based on the estimated level of interest of the users of the secondary stations,
wherein a secondary station of the plurality of secondary stations indicates the estimated level of interest by transmitting a predetermined signal in a preselected one of the plurality of random access slots, the estimated level of interest based on at least a threshold value; and
wherein each access slot of the plurality of random access slots includes a combination of one time slot and one signature, and wherein the at least one primary station maps each of the plurality of random access slots to a different service such that the plurality of secondary stations interested in one service transmit using one of the plurality of random access slots, and in that each combination of one time slot and one signature is contained in not more than one of the plurality of random access slots.

20. A secondary station for use in a radio network comprising:
a primary station (PS) and a plurality of the secondary stations (SS1, SS2, SS3),
wherein the primary station (PS) includes means for determining an estimated level of interest by users of secondary stations in a service, the means providing a plurality of random access slots that are selectively configured for permitting a temporary or permanent allocation of a portion of the plurality of random access slots based on the estimated level of interest of the users of the secondary stations,
wherein a secondary station of the plurality of secondary stations indicates the estimated level of interest by transmitting a predetermined signal in a preselected one of the plurality of random access slots, the estimated level of interest based on at least a threshold value; and
wherein each access slot of the plurality of random access slots includes a combination of one time slot and one signature, and wherein the primary station maps each of the plurality of random access slots to a different service such that all the secondary stations interested in one service transmit using one of the plurality of random access slots, and in that each combination of one time slot and one signature is contained in not more than one of the plurality of random access slots.

* * * * *